United States Patent
Rangarajan (10) Patent No.: US 10,001,776 B2
(45) Date of Patent: Jun. 19, 2018

(54) UNMANNED AERIAL VEHICLE FLIGHT CONTROL SYSTEM

(71) Applicant: The Boeing Company, Chicago, IL (US)

(72) Inventor: Murali Rangarajan, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 15/075,933

(22) Filed: Mar. 21, 2016

(65) Prior Publication Data

US 2017/0269611 A1    Sep. 21, 2017

(51) Int. Cl.
*B64F 5/60* (2017.01)
*G05D 1/00* (2006.01)
(Continued)

(52) U.S. Cl.
CPC .......... *G05D 1/0055* (2013.01); *B64C 39/024* (2013.01); *B64F 5/60* (2017.01); *B64C 2201/141* (2013.01); *B64D 2045/0085* (2013.01)

(58) Field of Classification Search
CPC ........ G05D 1/101; G05D 1/0055; G05D 1/10; G05D 1/00; B64F 5/00; B64F 5/0045; B64C 39/024
See application file for complete search history.

(56) References Cited

U.S. PATENT DOCUMENTS 5,377,109 A    12/1994 Baker et al.

7,410,122 B2    8/2008 Robbins et al.
(Continued)

FOREIGN PATENT DOCUMENTS

EP    2793096 A2    10/2014

OTHER PUBLICATIONS

Partial European Search Report dated Jun. 26, 2017 in European Patent Application No. 17159813.9 (European counterpart to the instant patent application).
(Continued)

*Primary Examiner* — Yonel Beaulieu
*Assistant Examiner* — Martin A Weeks
(74) *Attorney, Agent, or Firm* — Ostrager Chong Flaherty & Broitman P.C.

(57) ABSTRACT

An onboard system for controlling flight of an unmanned aerial vehicle. The system comprises: a flight management system configured for controlling flight of the unmanned aerial vehicle; a mission control module configured to send commands to the flight management system for guiding the unmanned aerial vehicle to perform a mission; a safety module configured to communicate commands to the flight management system for guiding the unmanned aerial vehicle to fly in a safe mode; a communication control component which is switchable between a mission state in which the flight management system receives commands from the mission control module and a safety state in which the flight management system receives commands from the safety module; and a monitor module configured to determine whether a trigger condition warranting a change in mode is present or not and to cause the communication control component to switch from the mission state to the safety state when the trigger condition is present.

24 Claims, 3 Drawing Sheets

(51) Int. Cl.
*B64C 39/02* (2006.01)
*B64D 45/00* (2006.01)

(56) References Cited

U.S. PATENT DOCUMENTS

| | | |
|---|---|---|
| 8,725,402 B2 | 5/2014 | Hoy |
| 8,954,206 B2 | 2/2015 | Criado |
| 2002/0161489 A1 | 10/2002 | Johnson |
| 2004/0044444 A1 | 3/2004 | Johnson et al. |
| 2007/0032923 A1 | 2/2007 | Mossman et al. |
| 2013/0085629 A1* | 4/2013 | Washington ............ B64C 13/18 701/15 |
| 2014/0189203 A1* | 7/2014 | Suzuki ................ G06F 12/0246 711/103 |
| 2014/0249693 A1* | 9/2014 | Stark .................... B64C 39/024 701/2 |
| 2014/0288730 A1 | 9/2014 | Fucke et al. |
| 2015/0051783 A1* | 2/2015 | Tamir .................. G05D 1/0088 701/25 |

OTHER PUBLICATIONS

Extended European Search Report dated Sep. 20, 2017 in European Patent Application No. 17159813.9 (European counterpart to the instant patent application).

\* cited by examiner

UNMANNED AERIAL VEHICLE FLIGHT CONTROL SYSTEM

BACKGROUND

The technology disclosed herein generally relates to unmanned aerial vehicles. More particularly, the technology disclosed herein relates to systems and methods for assuring that autonomous operation of an unmanned aerial vehicle does not give rise to an unsafe condition.

An unmanned aerial vehicle is a powered, heavier-than-air, aerial vehicle that does not carry a human operator, or pilot, and which uses aerodynamic forces to provide vehicle lift, can fly autonomously or be piloted remotely, can be expendable or reusable, and can carry a lethal or a non-lethal payload.

An autonomous mission for an unmanned aerial vehicle may comprise, for example, a mission of navigating the unmanned aerial vehicle to search for possible targets of interest at a known distant position that is beyond the radio communication range of a control station. Such a mission may further include processing of reconnaissance imaging data to detect and identify a target of interest, and navigating closer to the target to achieve a mission objective of capturing images to ascertain the identity of the target, or tracking movement of the target to identify a direction or heading of the target. Exemplary missions may further include, upon acquiring a mission objective of identifying a target or a direction of movement of the target, for example, generating commands to navigate the unmanned aerial vehicle to a position in communication range of the control station to transmit target information to the control station, or to return to and land at the initial position of the unmanned aerial vehicle.

In addition to military applications, the use of unmanned aerial vehicles in commercial applications is on the rise. With a growing presence of unmanned aerial vehicles in airspace around the world, it is likely that regulations will be imposed world-wide. The foremost requirement that may emerge is that operators of unmanned aerial vehicles in commercial airspace will be required to certify that their unmanned aerial vehicles will be constantly monitored for unsafe conditions or unsafe operation and can be switched to a safe mode when an unsafe condition or unsafe operation is detected.

SUMMARY

The subject matter disclosed in detail below is directed to a switchable flight control system onboard an unmanned aerial vehicle that is capable of constantly monitoring the vehicle operation for unsafe conditions or unsafe operation and switching the vehicle operation from a mission execution mode to a safe mode when an unsafe condition or unsafe operation is detected during execution of the mission. The embodiment disclosed in detail below includes a flight management system, an autonomous mission control module, a safety module, and a monitor module configured to monitor vehicle operation for unsafe conditions or unsafe operation and, when an unsafe condition or operation is detected, output a control signal to cause a communication control component to switch to a safe mode in which the flight management system receives communication of commands from the safety module instead of by the mission control module. When normal operation has been restored (which may be indicated to the monitor module by a signal from the mission control module), the monitor module then causes the communication control component to selectively communicate to the flight management system commands from the mission control module instead of the safety module.

As used herein, the term "module" should be construed broadly to encompass at least one computer or processor programmed with software, and which may have multiple programmed computers or processors that communicate through a network or bus. As used in the preceding sentence, the terms "computer" and "processor" both refer to devices comprising a processing unit (e.g., a central processing unit, an integrated circuit or an arithmetic logic unit). Two or more modules may comprise respective software applications executable by a common hardware component (e.g., a processor or computer) or respective software applications executable by respective and separate hardware components.

The embodiments disclosed in detail below employ verification and validation techniques to ensure the correct operation of an autonomous unmanned aerial vehicle, and to demonstrate that in a way that can be used for certification of the autonomous unmanned aerial vehicle. A monitor module is designed with the capability to monitor the execution of any autonomous system onboard the unmanned aerial vehicle and then trigger recovery mission actions if the system exits its safe operational bounds during performance of the originally planned mission.

One aspect of the subject matter disclosed in detail below is an onboard system for controlling flight of an unmanned aerial vehicle, comprising: a flight management system configured for controlling flight of the unmanned aerial vehicle; a mission control module configured to manage the mission by issuing commands addressed to the flight management system for guiding the unmanned aerial vehicle to perform a mission; a safety module configured to issue commands addressed to the flight management system for guiding the unmanned aerial vehicle to continue flying safely in a safe mode; a communication control component which is switchable between a mission state in which the flight management system receives communication of commands from the mission control module and a safety state in which the flight management system is in communication with and controlled by the safety module; and a monitor module configured to determine whether a trigger condition warranting a change in mode from a mission mode to a safe mode is present or not and to cause the communication control component to switch from the mission state to the safety state when the trigger condition is present. In accordance with various embodiments, the trigger condition is one of the following: (a) a command issued by the mission control module that is invalid or a parameter of a valid command issued by the mission control module that violates a constraint; (b) a fault or failure onboard the unmanned aerial vehicle which has been detected by a health status sensor; or (c) an unsafe flight condition detected by a flight status sensor. The monitor module is further configured to cause the communication control component to switch from the safety state to the mission state when normal operation of the mission module and aircraft are restored.

Another aspect of the subject matter disclosed in detail below is a method for controlling flight of an unmanned aerial vehicle, comprising: (a) sending commands from a mission control module onboard the unmanned aerial vehicle to a flight management system onboard the unmanned aerial vehicle for guiding the unmanned aerial vehicle to perform a mission; (b) monitoring validity of the commands sent from the mission control module to the flight management system; (c) determining if a trigger condition is present based on the commands sent from the mission control module to the flight management system (by determining that the command is invalid, for example); and (d) guiding the unmanned aerial vehicle in accordance with the validated commands sent from the mission control module to the flight management system. This method may further comprise: (e) determining that a command sent from the mission control module to the flight management system is invalid; (f) discontinuing the communication of invalidated commands from the mission control module to the flight management system; (g) communicating commands from a safety module onboard the unmanned aerial vehicle to the flight management system for guiding the unmanned aerial vehicle to operate in a safe mode; and (h) rebooting the mission control module when the command issued by the mission control module is invalid. In accordance with some embodiments, step (b) comprises monitoring whether a value of a parameter included in the command issued by the mission control module violates a constraint or not. The monitored parameter may be one of the following group: a heart-beat output from the mission control module, a rate of turn, a rate of climb, a rate of descent, a roll rate, a pitch rate, and a yaw rate.

A further aspect of the subject matter disclosed in detail below is a method for controlling flight of an unmanned aerial vehicle, comprising: (a) communicating commands from a mission control module onboard the unmanned aerial vehicle to a flight management system onboard the unmanned aerial vehicle for guiding the unmanned aerial vehicle to perform a mission in a mission mode; (b) monitoring whether a trigger condition warranting a change in mode from the mission mode to a safe mode is present or not; and (c) communicating commands from a safety module onboard the unmanned aerial vehicle to the flight management system instead of communicating commands from the mission control module for guiding the unmanned aerial vehicle to operate in the safe mode when the trigger condition is present. In accordance with various embodiments, the trigger condition is one of the following: (a) that a command issued by the mission control module is invalid or that a parameter of a valid command issued by the mission control module violates a constraint; (b) that a health status sensor has detected a fault or failure onboard the unmanned aerial vehicle; (c) that a flight status sensor has detected an unsafe flight condition; or (d) that a position of an object relative to the unmanned aerial vehicle violates a constraint.

Yet another aspect is an onboard system for controlling flight of an unmanned aerial vehicle, comprising: a flight management system configured for controlling flight of the unmanned aerial vehicle; a mission control module configured to manage a mission in a mission mode by issuing commands addressed to the flight management system for guiding the unmanned aerial vehicle to perform the mission; a safety module configured to issue commands addressed to the flight management system for guiding the unmanned aerial vehicle to continue flying safely in a safe mode; and a monitor module configured to determine whether a trigger condition warranting a change in mode from a mission mode to a safe mode is present or not, wherein the flight management system will receive communication of commands from the safety module and not from the mission control module in response to a determination by the monitor module that the trigger condition is present. Preferably the foregoing system further comprises a communication control component which is hardware switchable between a mission state in which the flight management system receives communication of commands from the mission control module and a safety state in which the flight management system receives communication of commands from the safety module, the state of the communication control component being controlled by an output from the monitor module.

Other aspects of systems, devices and methods for assuring safe autonomous operation of an unmanned aerial vehicle are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

An illustrative embodiment of a system for controlling flight of an unmanned aerial vehicle is described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

An unmanned aerial vehicle may be a fixed wing aerial vehicle, a rotorcraft, or a vertical takeoff and landing vehicle having a jet engine and lift fans. The switchable control system disclosed herein can be used onboard any unmanned aerial vehicle regardless of the type of propulsion system used by the unmanned aerial vehicle.

Figure 1:
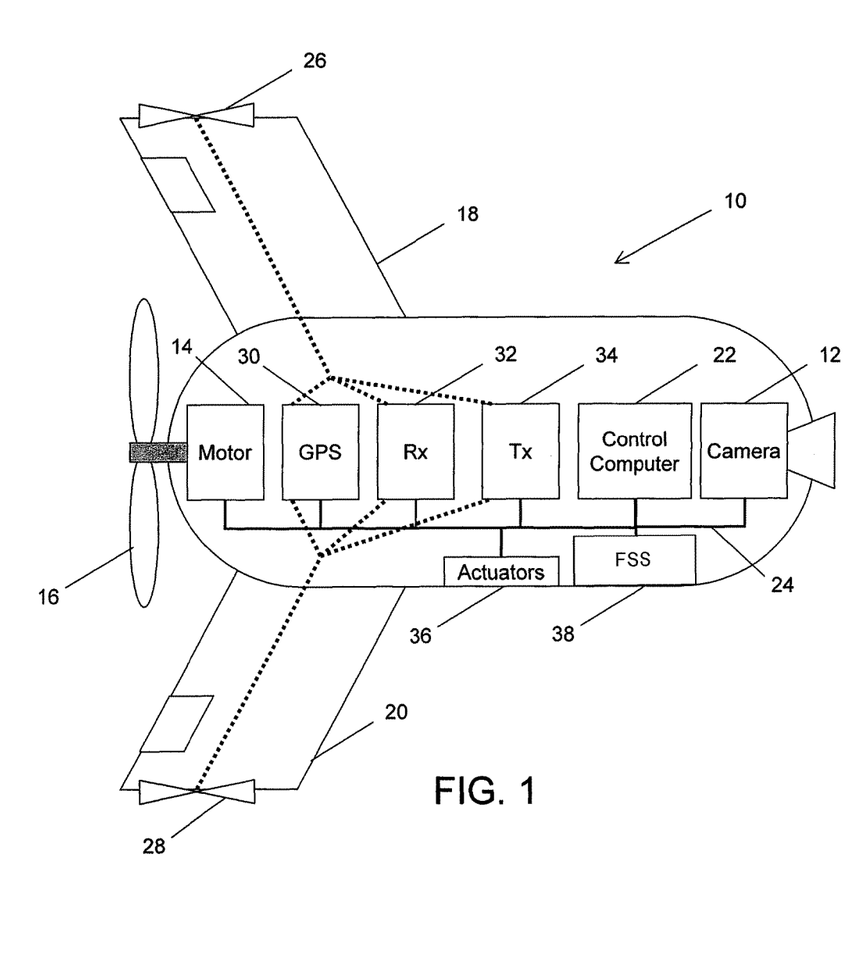
FIG. 1 is a block diagram showing the layout of major subsystems of a typical unmanned aerial vehicle.

FIG. 1 shows the layout of major subsystems of an unmanned aerial vehicle 10 of a type which may employ the enhanced flight control system disclosed herein. The unmanned aerial vehicle 10 has a camera 12 in the front end thereof and a motor 14 in the rear end thereof. The motor 14 drives rotation of a propeller 16. All subsystems communicate with an onboard control computer 22 via one or more data buses 24. The unmanned aerial vehicle 10 depicted in FIG. 1 has two antennas 26 and 28 respectively mounted at the tips of wings 18 and 20. Each antenna connects to a GPS receiver 30, a regular radio receiver (Rx) 32, and a radio transmitter (Tx) 34. The unmanned aerial vehicle 10 further comprises actuators 36 and flight status sensors (FSS) 38 which also communicate with the control computer 22 via one or more data buses 24.

Figure 2:
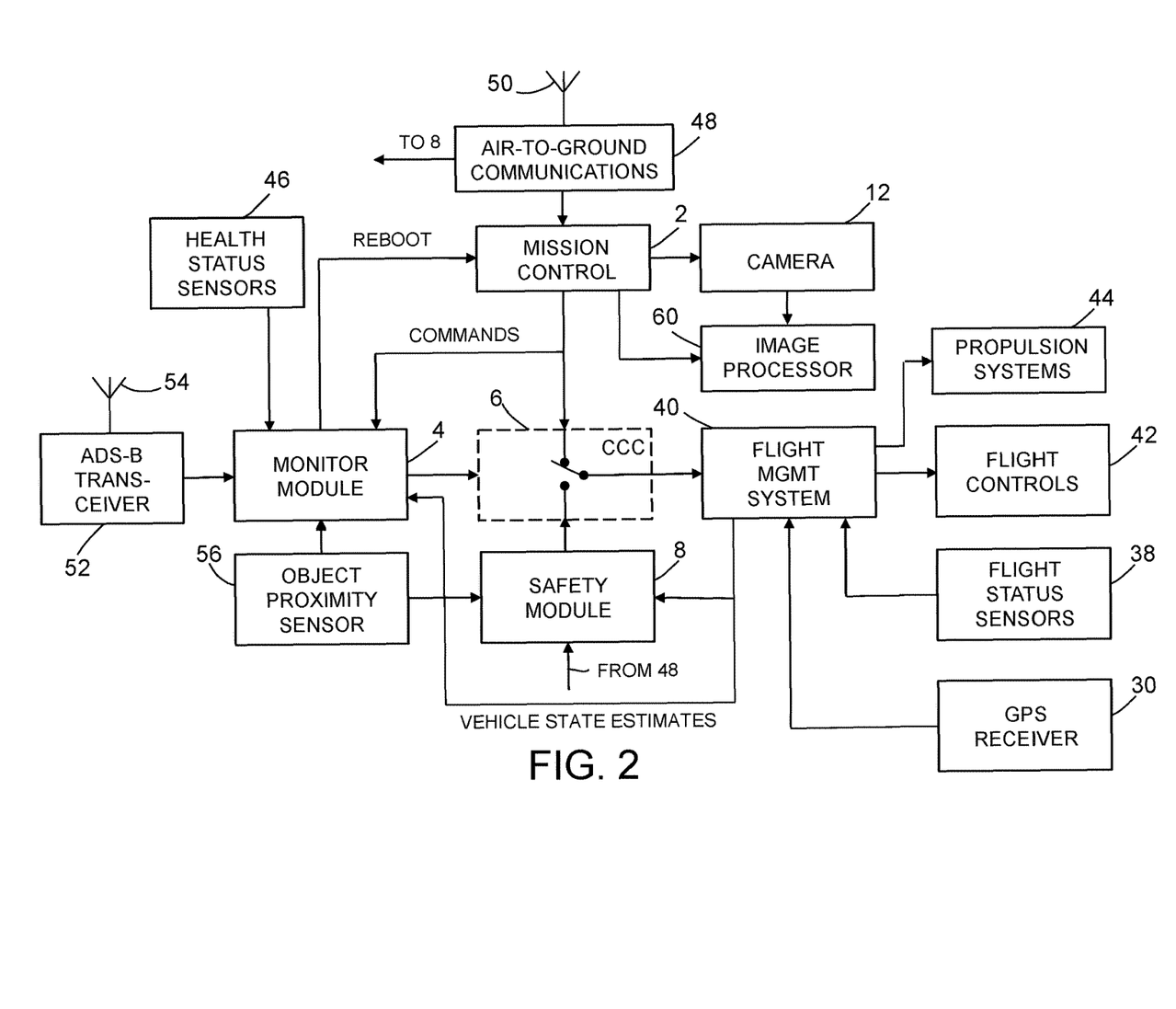
FIG. 2 is a block diagram showing an overall architecture of an onboard system for controlling flight of an unmanned aerial vehicle in accordance with one embodiment.

The unmanned aerial vehicle 10 depicted in FIG. 1 may be modified to incorporate all of the components depicted in FIG. 2. In alternative embodiments, the components depicted in FIG. 2 can be incorporated in other types of unmanned aerial vehicles. For example, the components depicted in FIG. 2 can be incorporated in an unmanned aerial vehicle of the type having lift fans. As another example, the components depicted in FIG. 2 can be incorporated in an unmanned aerial vehicle having lift fans in joined wings and a thrust-vectoring engine that provide it with vertical takeoff and landing capabilities, including hovering, as well as both low- and high-speed maneuverability.

Referring to FIG. 2, an onboard system for controlling flight of an unmanned aerial vehicle in accordance with one embodiment comprises the following components: a flight management system 40 (comprising at least a flight management computer and a non-transitory tangible computer-readable storage medium) configured for controlling flight of the unmanned aerial vehicle; a mission control module 2 configured to manage the mission by issuing commands addressed to the flight management system 40 for guiding the unmanned aerial vehicle to perform a mission in a mission mode; a safety module 8 configured to issue commands addressed to the flight management system 40 for guiding the unmanned aerial vehicle to continue flying safely in a safe mode which is designed to ensure the recovery of the unmanned aerial vehicle; a communication control component (CCC) 6 which is switchable between a mission state (shown in FIG. 2) in which the flight management system 40 receives communication of commands from the mission control module 2 and a safety state (not shown in FIG. 2) in which the flight management system 40 receives communication of commands from the safety module 8; and a monitor module 4 configured to determine whether a triggering condition is present, such as when commands issued by the mission control module 2 are determined to be invalid, and then set the state of the communication control component 6 depending on the outcome of that determination. The monitor module 4 is configured to switch the communication control component 6 from the mission state to the safety state when a triggering condition is present, such as when the commands issued by the mission control module 2 are invalid or when some other trigger condition is present. An invalid command may comprise, for example, a command or signal to activate a specific component or equipment that is not actually installed on the unmanned aerial vehicle. An invalid command may also comprise, for example, a command for deploying landing gear when the landing gear door is closed, or an engine speed command that is missing a speed parameter value.

More specifically, the mission control module 2 may not be programmed to act on exceptional aircraft conditions (e.g., engine loss or overheating) and if it continues to operate in such conditions, it will create a hazard even when generating and communicating valid commands. In accordance with a preferred embodiment, the monitor module 4 is configured to switch the communication control component 6 to a safe mode when any one of the following trigger conditions occurs: (a) invalid commands are directed to the flight management system 40 by the mission control module 2; (b) valid commands with invalid parameters (i.e., parameters having values that violate a constraint) are directed to the flight management system 40 by the mission control module 2; (c) the health status sensors 46 detect an aerial vehicle fault or failure; and (d) the flight status sensors 38 detect an unsafe flight condition (e.g., stall, loss of air traffic control signals, etc.).

The communication control component 6 may comprise physical circuitry (i.e., hardware) for connecting the flight management system 40 to either the mission control module 2 or the safety module 8. In the embodiment depicted in FIG. 2, the communication control component 6 is an electrical switch. In the alternative, the communication control component 6 may comprise a physical connection of a port, such as a TCP/IP port, for each of the safety module 8 and mission control module 2, to a port, such as a TCP/IP port, for communication with the flight management system 40. Alternatively, the communication control component 6 may comprise a router, or other component, in combination with software for selectively communicating commands from either the mission control module 2 or the safety module 8 to the flight management system 40.

In accordance with an alternative embodiment, the communication control component 6 may be implemented in hardware, on a printed circuit board configured to conduct Ethernet signals (with proper electronic properties) across the board. For example, the communication control component 6 may be an Ethernet switch that receives electrical signals from the monitor module 4, has inputs which are connected to the mission control module 2 and the safety module 8 via Ethernet connectors, and has outputs connected to the flight management system 40 via Ethernet connectors. The monitor module 4 would control the switching logic of the Ethernet switch, and the switching logic would enforce an XOR functionality to ensure only one path each way is valid at any given time.

The mission control module 2 can communicate with a ground control station (not shown in FIG. 2) by way of an air-to-ground communications system 48 and an antenna 50. The mission control module 2 may be a computer having a general-purpose or mission-specific architecture and programmed with software specifically designed for executing operations of a selected mission plan. The mission plan may be either stored in a non-transitory tangible computer-readable storage medium onboard the unmanned aerial vehicle prior to launch or received from the ground control station via the air-to-ground communications system 48 and the antenna 50 during flight.

The communications between the mission control module 2 and a ground control station may take place over a relay network or a satellite network, i.e., not exclusively direct communications between the mission control module 2 and the ground control station. Alternatively, the control station may be onboard an airplane.

The mission control module 2 may be configured to monitor the progress of a mission or operation tasked to the unmanned aerial vehicle. The mission control module may include flight planning software, learning algorithms and so forth. The mission control module 2 may gather information while monitoring the progress of a mission or operation. The information gathered may indicate a conflict in the mission plan, which the mission control module 2 may be capable of solving using a negotiation algorithm. In addition, the mission control module 2 sends commands to the communication control component 6 which are addressed to the flight management system 40 to perform operations. These commands may provide parameters for performing an operation or may provide a portion of the parameters for performing an operation. In other examples, these commands may not provide parameters for performing an operation and may allow the flight management system 40 to select all or a portion of these parameters for performing the operation.

The flight management system 40 may have a number of configurations for controlling the performance of operations. Each of a number of configurations may include, for example, without limitation, at least one of a number of processes, programming code, a number of algorithms, a number of tools, a number of controls, and/or a number of other suitable elements for a configuration of the flight management program.

Still referring to FIG. 2, the flight management system 40 receives GPS data from a GPS receiver 30 and flight status data from the flight status sensors 38 and, using that information, computes vehicle state estimates (e.g., position, airspeed, etc.) using a vehicle state estimator. The vehicle state estimator may comprise a computer or processor configured to estimate vehicle state parameters based on air data (e.g., airspeed, angle of attack, temperature and barometric altitude) and inertial reference (e.g., attitude, flight path vector, ground speed and position) information provided by the flight status sensors 38, and further based on position data received from the GPS receiver 30. The vehicle state estimates are output by the flight management system 40 to the monitor module 4 and to the safety module 8. Optionally, the vehicle state estimates can also be provided to the mission control module 2.

In addition, the flight management system 40 uses the vehicle state estimates in the course of performing its functions. More specifically, the flight management system 40 has guidance and navigation functions which issue commands to various flight controls 42 (e.g., flight control surfaces) of the unmanned aerial vehicle; and the flight management system 40 also has thrust and/or lift management functions which issue commands to various propulsion systems 44 for producing desired levels of thrust and/or lift.

The monitor module 4 is configured to determine whether a triggering condition is present, such as when the commands issued by the mission control module 2 are determined to be invalid, such as by monitoring whether those commands produce a condition that violates a constraint. In accordance with various embodiments, the monitored parameter is one of the following: heart-beat output from the mission control module, rate of turn of the unmanned aerial vehicle, rate of climb of the unmanned aerial vehicle, rate of descent of the unmanned aerial vehicle, roll rate of the unmanned aerial vehicle, pitch rate of the unmanned aerial vehicle, yaw rate of the unmanned aerial vehicle, a position of an object relative to an intended flight path of the unmanned aerial vehicle, and a distance from the unmanned aerial vehicle to the object.

In embodiments in which the monitored parameter is calculated based at least in part on vehicle state estimates, the monitor module 4 is configured to use the vehicle state estimates to calculate current values for the various parameters being monitored. Those current values are in turn compared to respective thresholds to determine whether any constraints have been violated.

In accordance with other embodiments, the monitor module 4 is configured to monitor the position of an object relative to the position and intended flight path of the unmanned aerial vehicle. As shown in FIG. 2, the unmanned aerial vehicle can be equipped to receive information concerning the position of an object. For example, the unmanned aerial vehicle may comprise an ADS-B receiver 52 which can be datalinked to other similarly equipped aircraft via an antenna 54. As is well known, Automatic Dependent Surveillance-Broadcast (ADS-B) technology enables determination of traffic positions and other data, in real-time, with position and velocity data being transmitted every second. The ADS-B receiver 52 is capable of informing the monitor module 4 regarding the position and velocity of any ADS-B-equipped object within ADS-B range. In this configuration, the monitor module 4 will monitor the position of the object relative to an intended flight path of the unmanned aerial vehicle and issue a signal in the event that the flight path of the unmanned aerial vehicle will intersect the volume of space where the object is located. In addition or in the alternative, the unmanned aerial vehicle may be equipped with an object proximity sensor 56 (e.g., a laser range finder) that measures the distance from the unmanned aerial vehicle to the object. In this configuration, the monitor module 4 will monitor the distance separating the object and unmanned aerial vehicle and issue a signal in the event that the flight path of the unmanned aerial vehicle will lose separation from the object. In accordance with a further alternative, the unmanned aerial vehicle may be equipped with a radar system for tracking the positions of objects within range of the radar system.

As depicted in FIG. 2, the mission control module 2 may be further configured to send commands to a camera 12 and to an image processor 60. The image processor in turn is configured to process images captured by camera. The processed images can be stored in a non-transitory tangible computer-readable storage medium onboard the unmanned aerial vehicle, to be downloaded later when the unmanned aerial vehicle has reached a position or landed within an image transmission range of a ground control station. Optionally, the mission control module 2 may be configured with camera deployment software for controlling a pan-tilt unit (not shown in the drawings) to which the camera is mounted.

The components of the switchable control system may be separate modules as previously defined. The mission control module 2 is configured to receive communications from a ground-based control station. Those communications may include mission objectives such as a known position at which to perform a reconnaissance mission. The mission control module 2 may be further configured to autonomously plan the navigation of the unmanned aerial vehicle to a mission position and determine guidance commands for instructing the flight management system 40 to control the flight and direction of the unmanned aerial vehicle. The mission control module 2 may be further configured to generate commands instructing the camera 12 to acquire images and instructing the image processor 60 to process the acquired image data for the purposes of detecting and identifying a target of interest. Additionally, the mission control module 2 is configured to generate commands for communication (via the communication control component 6) to the flight management system 40, including commands to turn, tilt, spin, climb, descend, etc., for orienting or guiding the unmanned aerial vehicle to track movement of a target of interest or move closer to the target to capture images for ascertaining its identity.

In an exemplary embodiment, the unmanned aerial vehicle includes a control board, component or circuitry that incorporates at least the monitor module 4, communication control component 6 and safety module 8.

The monitor module 4 may comprise hardware and/or software, and includes executable commands which are configured to monitor inputs or commands sent from the mission control module 2 to the flight management system 40. The monitor module 4 provides an output to the communication control component 6 to cause the latter to selectively communicate to the flight management system 40 either commands from the mission control module 2 or commands from the safety module 8 based on the determination by the monitor module 4, wherein the state of the communication control component during execution of a mission is to communicate mission commands from the mission control module 2 to the flight management system 40.

In accordance with one embodiment, the monitor module 4 executes an algorithm that determines whether the mission control module 2 is operating or communicating at an expected rate (e.g., a heart-beat rate) or not. Upon a determination by the monitor module 4 that the mission control module 2 is not communicating or operating properly, the monitor module 4 initiates a reset of the mission control module 2 and generates an output to cause the communication control component 6 to selectively communicate to the flight management system 40 commands from the safety module 8. In the event that the monitor module 4 initiates a reset (or reboot), it may also initiate a reset timer. Upon expiration of the reset time, the monitor module 4 then monitors for input of signals and/or commands that are indicative of restored normal operation of the mission control module 2. If normal operation has been restored (which may be indicated to the monitor module 4 by a signal from the mission control module 2), the monitor module 4 then causes the communication control component 6 to selectively communicate to the flight management system 40 commands from the mission control module 2 (instead of the safety module 8).

In addition or in the alternative, the monitor module 4 executes one or more algorithms that determine whether the mission control module 2 is issuing commands that will cause a performance condition of the unmanned aerial vehicle to violate a constraint. The monitored performance condition may be one or more of the following: rate of turn, rate of climb or descent, roll rate, pitch rate (i.e., rate of tilt), and yaw rate. If a specified threshold of any one of those flight parameters is violated, the monitor module 8 is configured to switch the state of the communication control component 6 to selectively communicate to the flight management system 40 commands from the safety module 8 and thereby cause the unmanned aerial vehicle to revert to flying in a safe mode.

In accordance with some embodiments, the monitor module 4 is configured to switch to the safe mode when a position of an object relative to an intended flight path of the unmanned aerial vehicle would cause an obstruction or collision, or when there is a loss of separation between the unmanned aerial vehicle and an object.

In the event that the monitor module 4 causes the communication control component 6 to connect the flight management system 40 to the safety module 8, the safety module may, for example, send commands for guiding or navigating the unmanned aerial vehicle to return to and land at an initial position. In addition, the safety module may, for example, be configured to send commands for guiding or navigating the unmanned aerial vehicle away from nearby objects based on ADS-B information about the nearby objects, or sensor data obtained by the object proximity sensor 56 about a nearby object. The safety module 8 may also send commands for guiding or navigating the unmanned aerial vehicle towards a ground-based control station to reestablish communication with the control station for enabling remote guidance of the unmanned aerial vehicle.

Figure 3:
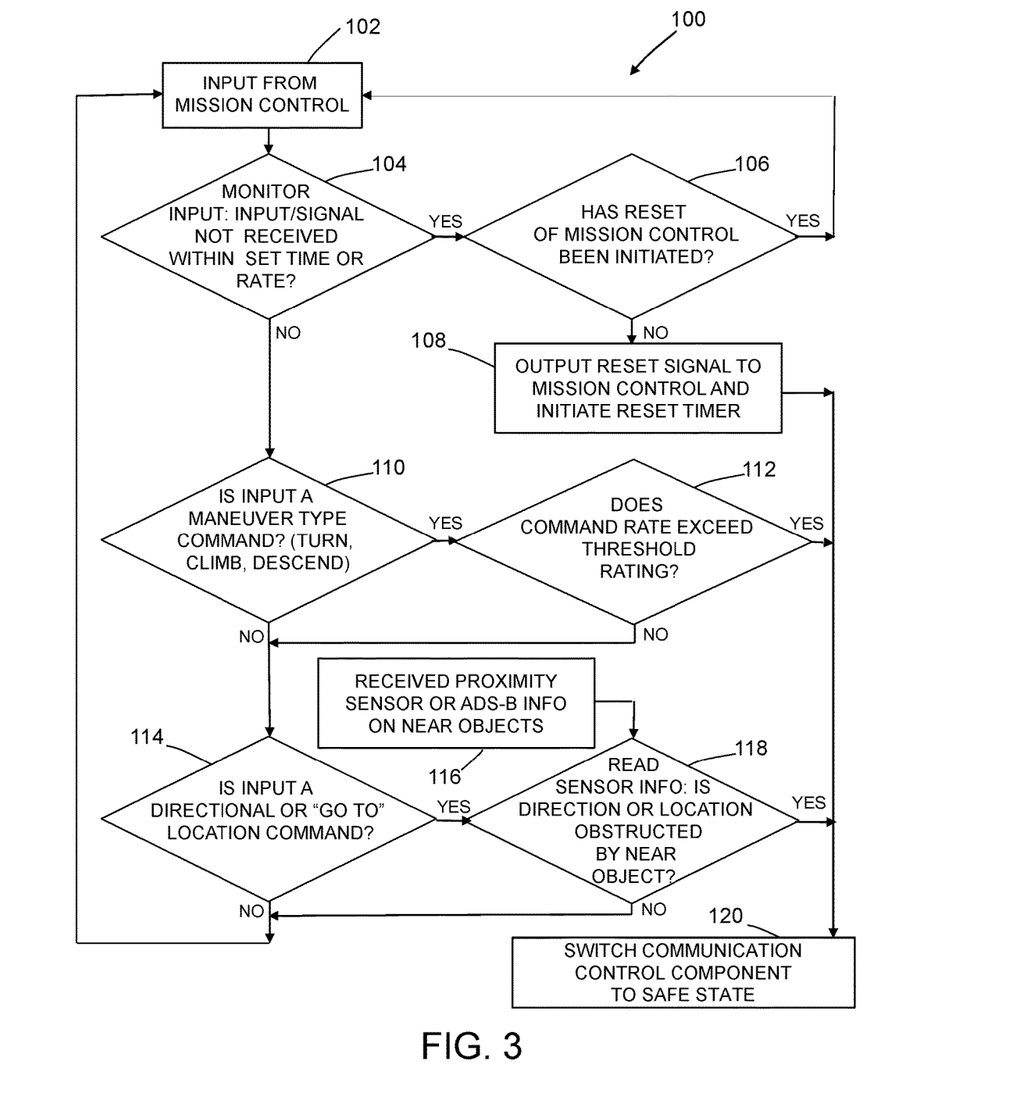
FIG. 3 is a flowchart identifying steps of a method for controlling flight of an unmanned aerial vehicle in accordance with one embodiment.

To summarize the foregoing, FIG. 3 identifies steps of a method 100 for controlling flight of an unmanned aerial vehicle using the monitor module of the system depicted in FIG. 2. The monitor module 4 receives commands from the mission control module (step 102). The monitor module 4 then determines whether the input/signal was or was not received within a preset time or at a preset minimum rate (step 104).

If the input was not received within the preset time or at the preset minimum rate, the monitor module 4 determines whether reset of the mission control module 2 has been initiated or not (step 106). If reset has been initiated, then the monitor module 4 continues to monitor inputs from the mission control module 2. If reset has not been initiated, then the monitor module 4 will output a reset (i.e., reboot) signal to the mission control module 2 and initiate a reset timer (step 108). Then the monitor module 4 outputs a control signal to the communication control component 6 that switches to the safe state (step 120), causing the communication control component 6 to block commands from the mission control module 2 but allow commands from the safety module 8 to the flight management system 40.

Referring again to step 104 in FIG. 3, if the monitor module input was received within the preset time or at a rate above the preset minimum rate, the monitor module 4 determines whether the input is a maneuver type command, such as turn, climb or descend (step 110). If the input is a maneuver type command, then the monitor module 4 determines whether the commanded rate violates a specified threshold (step 112) or not. If the commanded rate violates the specified threshold, then the monitor module 4 outputs a control signal to the communication control component 6 that switches to the safe state (step 120). If the commanded rate does not violate the specified threshold, then the monitor module 4 proceeds to step 114.

Returning to step 110, if the input to the monitor module 4 is not a maneuver type command, the monitor module 4 then determines whether the input is a directional or "go to" location command (step 114) or not. If the input to the monitor module 4 is not a directional or "go to" location command, then the process 100 returns to steps 102 and 104. If the input to the monitor module 4 is a directional or "go to" location command, then the monitor module 4 proceeds to step 118.

During process 100, the monitor module 4 receives ADS-B information from the ADS-B transceiver 52 and object proximity data from the object proximity sensor 56 (step 116). The monitor module 4 reads this information and uses it to calculate whether the direction or future location (i.e., intended flight path) of the unmanned aerial vehicle is obstructed by any near object (step 118). If the intended flight path of the unmanned aerial vehicle is obstructed, then the monitor module 4 outputs a control signal to the communication control component 6 that switches to the safe state (step 120). If the intended flight path of the unmanned aerial vehicle is not obstructed, then process 100 returns to steps 102 and 104.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An onboard system for autonomous operation of an unmanned aerial vehicle, comprising:
   a flight management system configured for controlling flight of the unmanned aerial vehicle;
   an autonomous mission control module configured to manage the mission by issuing commands addressed to the flight management system for guiding the unmanned aerial vehicle to perform a mission;
   a safety module configured to issue commands addressed to the flight management system for guiding the unmanned aerial vehicle to continue flying safely in a safe mode;
   a communication control component which is switchable between a mission state in which the flight management system receives communication of commands from the mission control module and a safety state in which the flight management system receives communication of commands from the safety module; and
   a monitor module configured to determine whether a trigger condition warranting a change in mode from a mission mode to a safe mode is present or not and to cause the communication control component to switch from the mission state to the safety state when the trigger condition is present,
   wherein the flight management system, mission control module, safety module, communication control component and monitor module are all located onboard the unmanned aerial vehicle to enable autonomous operation of the unmanned aerial vehicle.

2. The system as recited in claim 1, wherein the monitor module is further configured to cause the communication control component to switch from the safety state to the mission state when normal operation of the mission module and aircraft are restored.

3. The system as recited in claim 1, wherein the trigger condition is that a command issued by the mission control module is determined to be invalid or that a parameter of a valid command issued by the mission control module violates a constraint.

4. The system as recited in claim 3, wherein the monitor module is further configured to reboot the mission control module when the command issued by the mission control module is determined to be invalid.

5. The system as recited in claim 1, further comprising a health status sensor, wherein the trigger condition is that the health status sensor has detected a fault or failure onboard the unmanned aerial vehicle.

6. The system as recited in claim 1, further comprising a flight status sensor, wherein the trigger condition is that the flight status sensor has detected an unsafe flight condition.

7. The system as recited in claim 1, wherein the trigger condition is that a parameter of a valid command issued by the mission control module has a value that violates the constraint, wherein the parameter is one of the following group: a rate of turn, a rate of climb, a rate of descent, a roll rate, a pitch rate, and a yaw rate.

8. The system as recited in claim 1, further comprising:
   a plurality of flight status sensors; and
   a sensor connected to send data to the monitor module regarding a position of an object,
   wherein the flight management system comprises a vehicle state estimator that receives data from the flight status sensors and communicates vehicle state estimates, including at least a vehicle position and speed, to the monitor module, the monitor module is further configured to calculate a position of the object relative to the unmanned aerial vehicle, and to determine that a trigger condition is present when a position of an object relative to the unmanned aerial vehicle violates a distance constraint.

9. The system as recited in claim 8, wherein the sensor comprises an object proximity sensor connected to communicate data to the monitor module regarding proximity of the object.

10. The system as recited in claim 9, wherein the constraint is a minimum separation distance from the unmanned aerial vehicle to the object.

11. The system as recited in claim 10, wherein the safety module is further configured to send commands to the flight management system for guiding the unmanned aerial vehicle away from the object.

12. The system as recited in claim 1, wherein the safety module is further configured to send commands to the flight management system for guiding the unmanned aerial vehicle to fly to a specified position.

13. A method for autonomous operation of an unmanned aerial vehicle, comprising:
   (a) sending commands from a mission control module onboard the unmanned aerial vehicle to a flight management system onboard the unmanned aerial vehicle for guiding the unmanned aerial vehicle to perform a mission;
   (b) monitoring validity of the commands sent from the mission control module to the flight management system to determine when a trigger condition is present based on whether the commands sent from the mission control module to the flight management system are valid or invalid; and
   (c) guiding the unmanned aerial vehicle in accordance with the validated commands sent from the mission control module to the flight management system,
   wherein steps (a) through (c) are performed onboard the unmanned aerial vehicle.

14. The method as recited in claim 13, further comprising:
   (d) determining that a command sent from the mission control module to the flight management system is invalid;
   (e) discontinuing the communication of commands from the mission control module to the flight management system; and
   (f) communicating commands from a safety module onboard the unmanned aerial vehicle to the flight management system for guiding the unmanned aerial vehicle to operate in a safe mode,
   wherein steps (d) through (f) are performed onboard the unmanned aerial vehicle.

15. The method as recited in claim 14, further comprising rebooting the mission control module when the command issued by the mission control module is invalid.

16. The method as recited in claim 13, wherein step (b) comprises monitoring whether a value of a parameter included in the command issued by the mission control module violates a constraint or not.

17. The method as recited in claim 16, wherein the monitored parameter is one of the following group: a heart-beat rate of commands output from the mission control module, a rate of turn, a rate of climb, a rate of descent, a roll rate, a pitch rate, and a yaw rate.

18. A method for autonomous operation of an unmanned aerial vehicle, comprising:
- (a) communicating commands from a mission control module onboard the unmanned aerial vehicle to a flight management system onboard the unmanned aerial vehicle for guiding the unmanned aerial vehicle to perform a mission in a mission mode;
- (b) monitoring whether a trigger condition warranting a change in mode from the mission mode to a safe mode is present or not; and
- (c) communicating commands from a safety module onboard the unmanned aerial vehicle to the flight management system instead of communicating commands from the mission control module for guiding the unmanned aerial vehicle to operate in the safe mode when the trigger condition is present, wherein steps (a) through (c) are performed onboard the unmanned aerial vehicle.

19. The method as recited in claim 18, wherein the trigger condition is that a command issued by the mission control module is invalid or that a parameter of a valid command issued by the mission control module violates a constraint.

20. The method as recited in claim 18, wherein the trigger condition is that a health status sensor has detected a fault or failure onboard the unmanned aerial vehicle.

21. The method as recited in claim 18, wherein the trigger condition is that a flight status sensor has detected an unsafe flight condition.

22. The method as recited in claim 18, wherein the trigger condition is that a position of an object relative to the unmanned aerial vehicle violates a constraint.

23. An onboard system for autonomous operation of an unmanned aerial vehicle, comprising:
- a flight management system configured for controlling flight of the unmanned aerial vehicle;
- an autonomous mission control module configured to manage a mission in a mission mode by issuing commands addressed to the flight management system for guiding the unmanned aerial vehicle to perform the mission;
- a safety module configured to issue commands addressed to the flight management system for guiding the unmanned aerial vehicle to continue flying safely in a safe mode; and
- a monitor module configured to determine whether a trigger condition warranting a change in mode from a mission mode to a safe mode is present or not, wherein the flight management system receives commands from the safety module and not from the mission control module in response to a determination by the monitor module that the trigger condition is present, and wherein the flight management system, mission control module, safety module and monitor module are all located onboard the unmanned aerial vehicle to enable autonomous operation of the unmanned aerial vehicle.

24. The system as recited in claim 23, further comprising an onboard communication control component which is switchable between a mission state in which the flight management system is controlled by the mission control module and a safety state in which the flight management system is controlled by the safety module, the state of the communication control component being controlled by an output from the monitor module.

* * * * *